United States Patent
Raak et al.

(10) Patent No.: US 11,250,457 B1
(45) Date of Patent: Feb. 15, 2022

(54) PROMOTION PROCESSING SYSTEM FOR GENERATING A DIGITAL PROMOTION BASED UPON A SATISFACTION LEVEL DETERMINED FROM A FACIAL IMAGE AND RELATED METHODS

(71) Applicant: Inmar Clearing, Inc., Winston-Salem, NC (US)

(72) Inventors: Alise Raak, Winston-Salem, NC (US); Diana Medina, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 143 days.

(21) Appl. No.: 16/800,954

(22) Filed: Feb. 25, 2020

(51) Int. Cl.
  *G06Q 30/02* (2012.01)
  *G06K 9/00* (2022.01)
  *G06F 16/583* (2019.01)
  *G06F 16/951* (2019.01)

(52) U.S. Cl.
  CPC ..... *G06Q 30/0224* (2013.01); *G06F 16/5854* (2019.01); *G06F 16/951* (2019.01); *G06K 9/00281* (2013.01); *G06K 9/00302* (2013.01); *G06Q 30/0239* (2013.01)

(58) Field of Classification Search
  CPC ............ G06Q 30/0224; G06Q 30/0239; G06F 16/5854; G06F 16/951; G06K 9/00281; G06K 9/00302
  See application file for complete search history.

(56) References Cited

U.S. PATENT DOCUMENTS

| | | | | |
|---|---|---|---|---|
| 2014/0074649 | A1* | 3/2014 | Patel | G06Q 30/0631 705/26.7 |
| 2015/0356589 | A1* | 12/2015 | Jin | G06Q 30/0239 705/14.25 |
| 2016/0328875 | A1* | 11/2016 | Fang | G06K 9/00255 |
| 2018/0033074 | A1* | 2/2018 | Grueneberg | G06Q 30/0633 |
| 2019/0005571 | A1 | 1/2019 | Cho et al. | |
| 2019/0073601 | A1 | 3/2019 | Alkan et al. | |
| 2019/0354777 | A1* | 11/2019 | Beck | G06K 9/00268 |
| 2020/0160387 | A1* | 5/2020 | Gourley | G06Q 30/0244 |

OTHER PUBLICATIONS

Kulkarni et al.; "Facial expression (mood) recognition from facial images using committee neural networks;" BioMedical Engineering OnLine; 12 pages; 2009; published Aug. 5, 2009.

* cited by examiner

*Primary Examiner* — Scott C Anderson
(74) *Attorney, Agent, or Firm* — Allen, Dyer, Doppelt + Gilchrist, P.A.

(57) ABSTRACT

A promotion processing system may include a remote device associated with a given user and that includes a camera. The promotion processing system may also include a promotion processing server configured to store meal recipes and associated ingredients, and obtain a selected meal recipe from the given user. The promotion processing server may also be configured to cooperate with the camera of the remote device to obtain a facial image of the given user during consumption of ingredients of the selected meal recipe, determine a satisfaction level with the selected meal recipe based upon the facial image, and generate a digital promotion toward another meal recipe having at least one common ingredient with the ingredients of the selected meal recipe based upon the satisfaction level. The promotion processing server may also communicate the digital promotion to the remote device.

20 Claims, 6 Drawing Sheets

PROMOTION PROCESSING SYSTEM FOR GENERATING A DIGITAL PROMOTION BASED UPON A SATISFACTION LEVEL DETERMINED FROM A FACIAL IMAGE AND RELATED METHODS

TECHNICAL FIELD

The present application relates to the field of electronics, and, more particularly, to digital promotion systems, and related methods.

BACKGROUND

Sales of a particular product or service may be based upon how well that product or service is marketed to a consumer. One form of marketing is a coupon, typically in paper form, for a discount toward the product or service. Some coupons may be retailer-specific, for example, only redeemable for the discount at a particular retailer, while other coupons may be product-specific from a manufacturer and redeemable at any retailer.

A coupon, while typically in paper form, may be in digital form and may be referred to as a digital promotion. A digital promotion may be selected or "clipped" via a mobile phone and saved to a digital wallet for redemption at a point-of-sale (POS) terminal, for example. A typical coupon is applicable to a given product and has a redeemable value that may vary based upon the quantity of a given item, for example, brand of item, size of the product in terms of packaging, and/or the price point of the given item. A typical coupon may also be redeemable only at a given retailer and/or within a threshold time period.

A food recipe typically includes a set of instructions that describes how to prepare or make a meal or prepared food. Recipes were typically printed in books or other print media. With the increasing popularity of electronic commerce (e-commerce), an increasing amount of recipes are being published online.

SUMMARY

A promotion processing system may include a remote device associated with a given user and including a camera, and a promotion processing server. The promotion processing server may be configured to store a plurality of meal recipes and associated ingredients, obtain a selected meal recipe from the given user, and cooperate with the camera of the remote device to obtain a facial image of the given user during consumption of ingredients of the selected meal recipe. The promotion processing server may also be configured to determine a satisfaction level with the selected meal recipe based upon the facial image, generate a digital promotion toward another meal recipe having at least one common ingredient with the ingredients of the selected meal recipe based upon the satisfaction level, and communicate the digital promotion to the remote device.

The promotion processing server may be configured to apply image processing to the facial image to extract a plurality of facial features, and determine a facial expression of the given user during consumption of the ingredients based upon the plurality of facial features. The promotion processing server may also be configured to determine the satisfaction level based upon the facial expression, for example.

At least one of the plurality of facial features may include a visibility of teeth. At least one of the plurality of facial features may include a mouth-opening distance, for example. At least one of the plurality of facial features may include an eyebrow raise distance, for example.

The at least one digital promotion may have a redemption value associated therewith. The promotion processing server may be configured to set the redemption value based upon the satisfaction level, for example.

The promotion processing server may be configured to determine the another meal recipe based upon the satisfaction level. The promotion processing server may be configured to communicate the another meal recipe to the remote device, for example.

The digital promotion may be redeemable toward the common ingredient of the another meal recipe, for example. The promotion processing server may be configured to obtain the selected meal recipe based upon user input at the remote device. The remote device may include a mobile wireless communications device, for example.

A method aspect is directed to a method of processing a promotion. The method may include using a promotion processing server to store a plurality of meal recipes and associated ingredients, obtain a selected meal recipe from a given user, and cooperate with a camera of a remote device associated with the given user to obtain a facial image of the given user during consumption of ingredients of the selected meal recipe. The method may also include using the promotion processing server to determine a satisfaction level with the selected meal recipe based upon the facial image, generate a digital promotion toward another meal recipe having at least one common ingredient with the ingredients of the selected meal recipe based upon the satisfaction level, and communicate the digital promotion to the remote device.

A computer readable medium aspect is directed to a non-transitory computer readable medium for processing a promotion. The non-transitory computer readable medium includes computer executable instructions that when executed by a processor cause the processor to perform operations. The operations may include storing a plurality of meal recipes and associated ingredients and obtaining a selected meal recipe from a given user. The operations may also include cooperating with a camera of a remote device associated with the given user to obtain a facial image of the given user during consumption of ingredients of the selected meal recipe and determining a satisfaction level with the selected meal recipe based upon the facial image. The operations may also include generating a digital promotion toward another meal recipe having at least one common ingredient with the ingredients of the selected meal recipe based upon the satisfaction level, and communicating the digital promotion to the remote device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
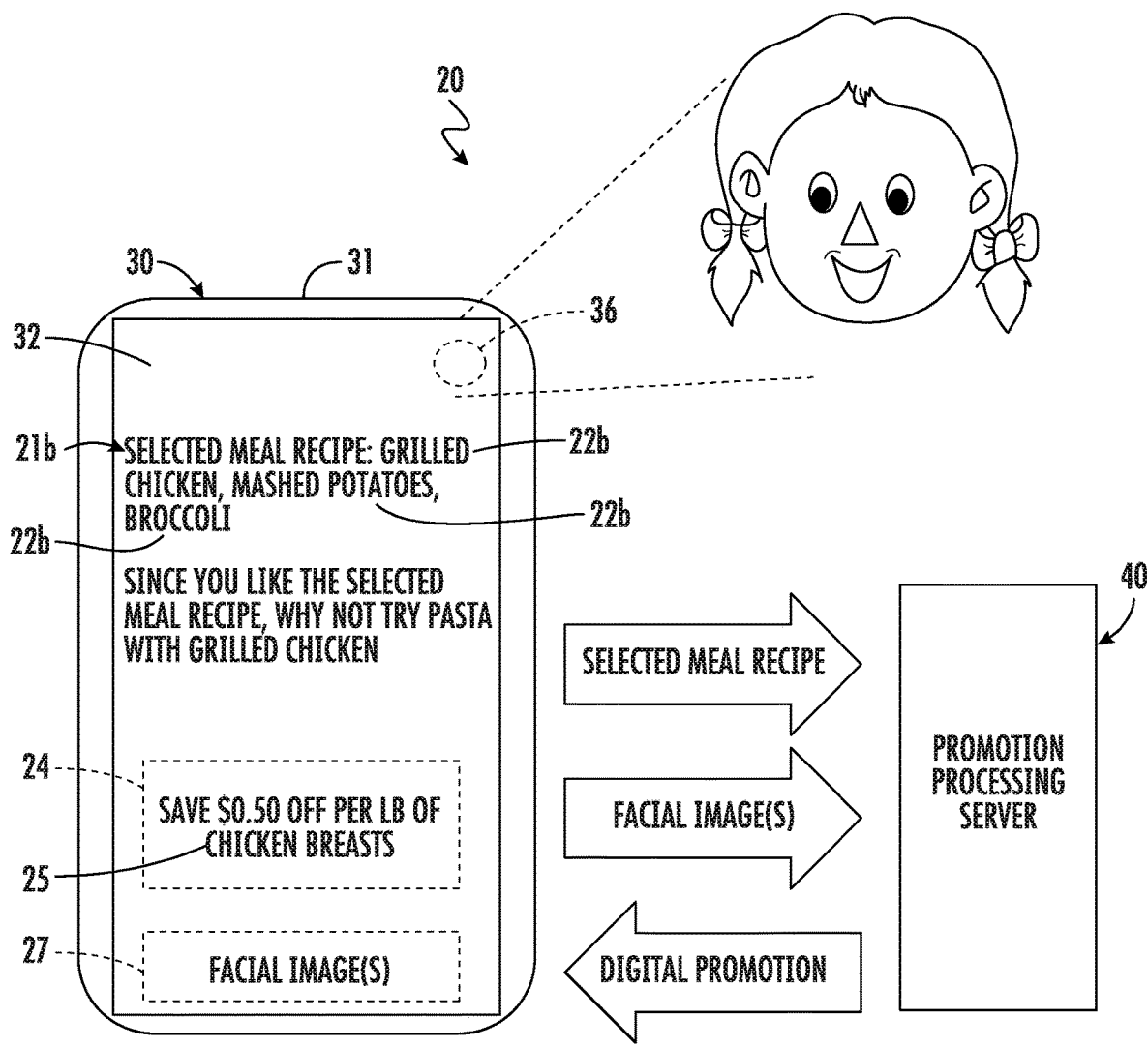
FIG. 1 is a schematic diagram of a promotion processing system according to an embodiment.
Figure 2:
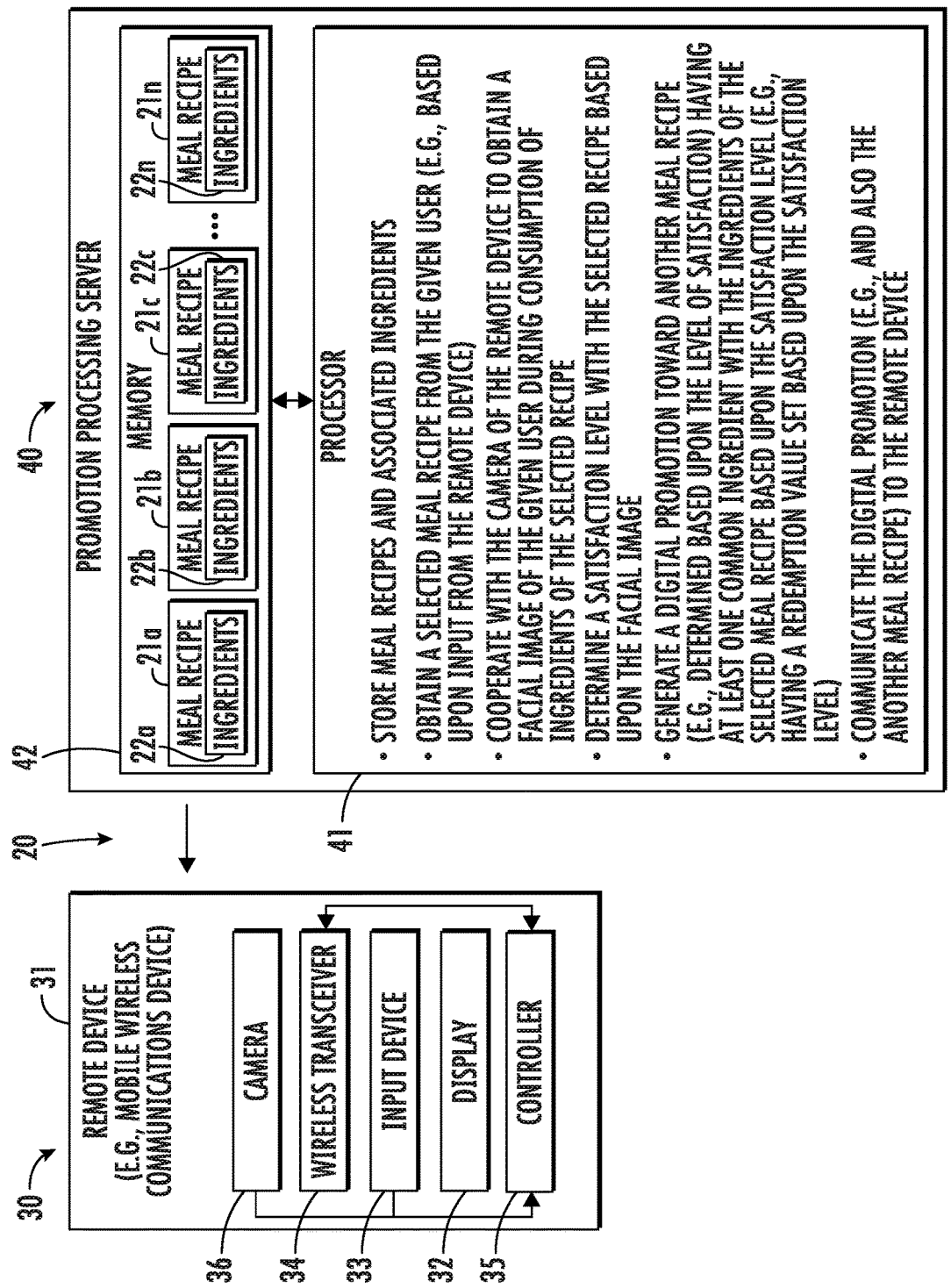
FIG. 2 is a schematic block diagram of the promotion processing system of FIG. 1.

Referring initially to FIGS. 1-2, a promotion processing system 20 includes a remote device 30 associated with a given user. The remote device 30 is illustratively in the form of a mobile wireless communications device and includes a housing 31, a display 32 carried by the housing, and an input device 33 also carried by the housing. The display 32 and the input device 33 may be in the form of a touch display, as will be appreciated by those skilled in the art. The remote device 30 also includes a wireless transceiver 34 and a remote device controller 35 coupled to the wireless transceiver. The display 32 and input device 33 are also coupled to the remote device controller 35.

A camera 36 is also carried by the housing 31 and is coupled to the remote device controller 35. While the remote device 30 is illustratively in the form of a mobile wireless communications device, the remote device may include or be in the form of a personal computer, laptop computer, tablet computer, or wearable device.

The promotion processing system 20 also includes a promotion processing server 40. The promotion processing server includes a processor 41 and an associated memory 42. While operations of the promotion processing server 40 are described herein, it will be appreciated that the processor 41 and memory 42 cooperate to perform the operations.

Figure 3:
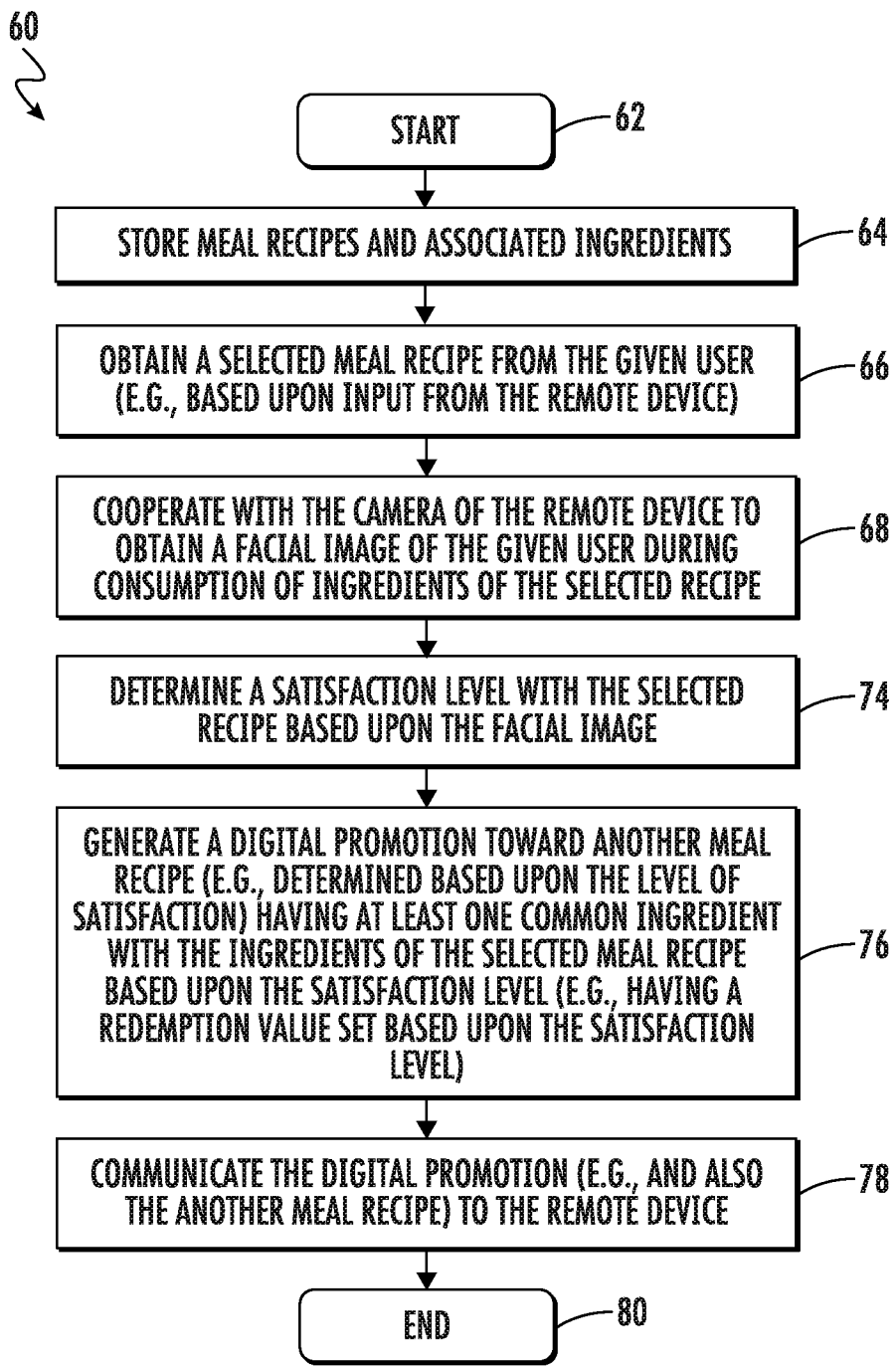
FIG. 3 is a flow diagram of operation of the promotion processing server of FIG. 2.

Referring now to the flowchart 60 in FIG. 3, beginning at Block 62, operations of the promotion processing server 40 will now be described. At Block 64, the promotion processing server 40 stores meal recipes 21a-21n and associated ingredients 22a-22n, for example, in the memory 42. For example, a meal recipe 21a-21n may include a recipe for an entire meal (e.g., a meal kit), or an individual meal item (e.g., grilled chicken). Similarly, the ingredients 22a-22n may be for an item in the meal kit (e.g., mashed potatoes) or an item for the individual meal item (e.g., salt, pepper, etc.). The meal recipes 21a-21n and associated ingredients 22a-22n may be stored in the memory 42 along with a corresponding user. In other words, the given user may be associated with the meal recipes 21a-21n, for example, and may have stored the meal recipes as a "saved recipe" or "liked recipe." The meal recipes 21a-21n may be meal recipes that are of interest to the given user and not necessarily recipes that have been previously prepared and consumed by the given user.

The promotion processing server 40, at Block 66, obtains a selected meal recipe 21b from the given user. For example, a listing of saved meal recipes 21a-21n associated with the given user may be displayed on the display 32 of the remote device 30, and the user may select, by way of the input device 33, the selected meal recipe 21b. The selected meal recipe 21b may be one selected by the given user for preparation and consumption.

The promotion processing server 40 cooperates with the camera 36 of the remote device 30 to obtain one or more facial images 27 of the given user during consumption of ingredients 22b of the selected meal recipe 21b (Block 68). In other words, the remote device 30 may be configured to capture still images or video of the given user's face as they eat the selected meal recipe 21b.

At Block 74, the promotion processing server 40 determines a satisfaction level with the selected meal recipe 21b based upon the facial image 27. Those skilled in the art will appreciate that the given user's facial image 27 may be representative of the satisfaction level of the given user with the selected meal recipe 21b. For example, if the given user does not like the selected meal recipe 21b, the facial image 27 may indicate such, for example, the facial image may include a frown or other distorted feature indicative of a lower satisfaction level. Conversely, if the given user likes the selected meal recipe 21b, the facial image 27 may indicate such, for example, the facial image may include a smile or other feature indicative of a higher satisfaction level.

The satisfaction level may conceptually be considered a score (e.g., 0 to 10) of the level of which the given user likes the selected meal recipe 21b. For example, a higher score (e.g., 7-10) may be indicative that the given user more strongly likes the selected meal recipe 21b, while a lower score (e.g., 0-3) may be indicative that the given user more strongly dislikes the selected meal recipe. A mid-range score (e.g. 4-6) may be indicative that the given user is ambivalent toward the selected meal recipe 21b. Further details of determining the satisfaction level will be described in further detail below.

The promotion processing server 40 generates a digital promotion 24 toward another meal recipe 25 having at least one common ingredient with the ingredients 22b of the selected meal recipe 21b based upon the satisfaction level (Block 76). More particularly, the promotion processing server 40 may generate the digital promotion 24 when the satisfaction level is indicative of overall satisfaction with the selected meal recipe 21b, for example, the given user likes the selected meal recipe. Alternatively, the promotion processing server 40 may generate the digital promotion 24 when the satisfaction level is indicative of overall dissatisfaction with the selected meal recipe 21b. For example, the promotion processing server 40 may generate the digital promotion 24 as an incentive to purchase another meal recipe 25 since the given user was dissatisfied with the selected meal recipe 21b.

The digital promotion 24 may be applicable to or redeemable toward the common ingredient of the meal recipes 21b, 25. For example, if the selected meal recipe 21b is a meal kit that includes mashed potatoes, grilled chicken, and broccoli, the digital promotion 24 may be redeemable toward any of potatoes, chicken, or broccoli. In another example, where the selected meal recipe is teriyaki chicken, the digital promotion 24 may be redeemable toward teriyaki sauce. Of course the digital promotion 24 may be redeemable toward another ingredient in the another meal recipe 25.

The another meal recipe 25 may be determined based upon the satisfaction level. For example, if the satisfaction level is indicative of dissatisfaction of the selected meal recipe 21b, e.g., when the selected meal recipe is a meal kit that includes mashed potatoes, grilled chicken, and broccoli, the another meal recipe 25 may be determined to be a broccoli-based pasta meal kit. However, if the satisfaction level is indicative of overall satisfaction of the selected meal recipe 21b, then the promotion processing server 40 may determine the another meal recipe 25 to be similar to that selected meal recipe (e.g., a grilled chicken based meal recipe).

In some embodiments, the promotion processing server 40 may generate the digital promotion 24 to have a redemption value that is based upon the satisfaction level. For example, if the promotion processing server 40 determines that the satisfaction level is indicative of the given user "loving" the selected meal recipe 21b, the promotion processing server may generate the digital promotion 24 to have a higher redemption value. Of course, the promotion processing server 40 may generate the digital promotion 24 to have a redemption value that is lower with a higher satisfaction level. For example, if the given user "loves" the selected meal recipe 21b, the given user may be more likely to repurchase the selected meal recipe without a promotion, and thus would receive a digital promotion 24 having a lower redemption value (e.g., $0.50 OFF).

At Block 78, the promotion processing server 40 communicates the digital promotion 24 to the remote device 30, for example, wirelessly. In some embodiments, the promotion processing server 40 may also communicate the another meal recipe 25 to the remote device 30, e.g., along with the digital promotion. The digital promotion 24 and/or the another meal recipe 25 may be displayed on the display 32 of the remote device 30. The digital promotion 24 may be stored in a digital wallet associated with the given user and/or displayed on the display 32 of the remote device 30 for redemption, for example, at a POS terminal. The another or new meal recipe 25 may be stored in the memory 42, for example, and be associated with the given user so that the another meal recipe is user-selectable in the future, for example, to be indicative of planned consumption. Operations end at Block 80.

Figure 4:
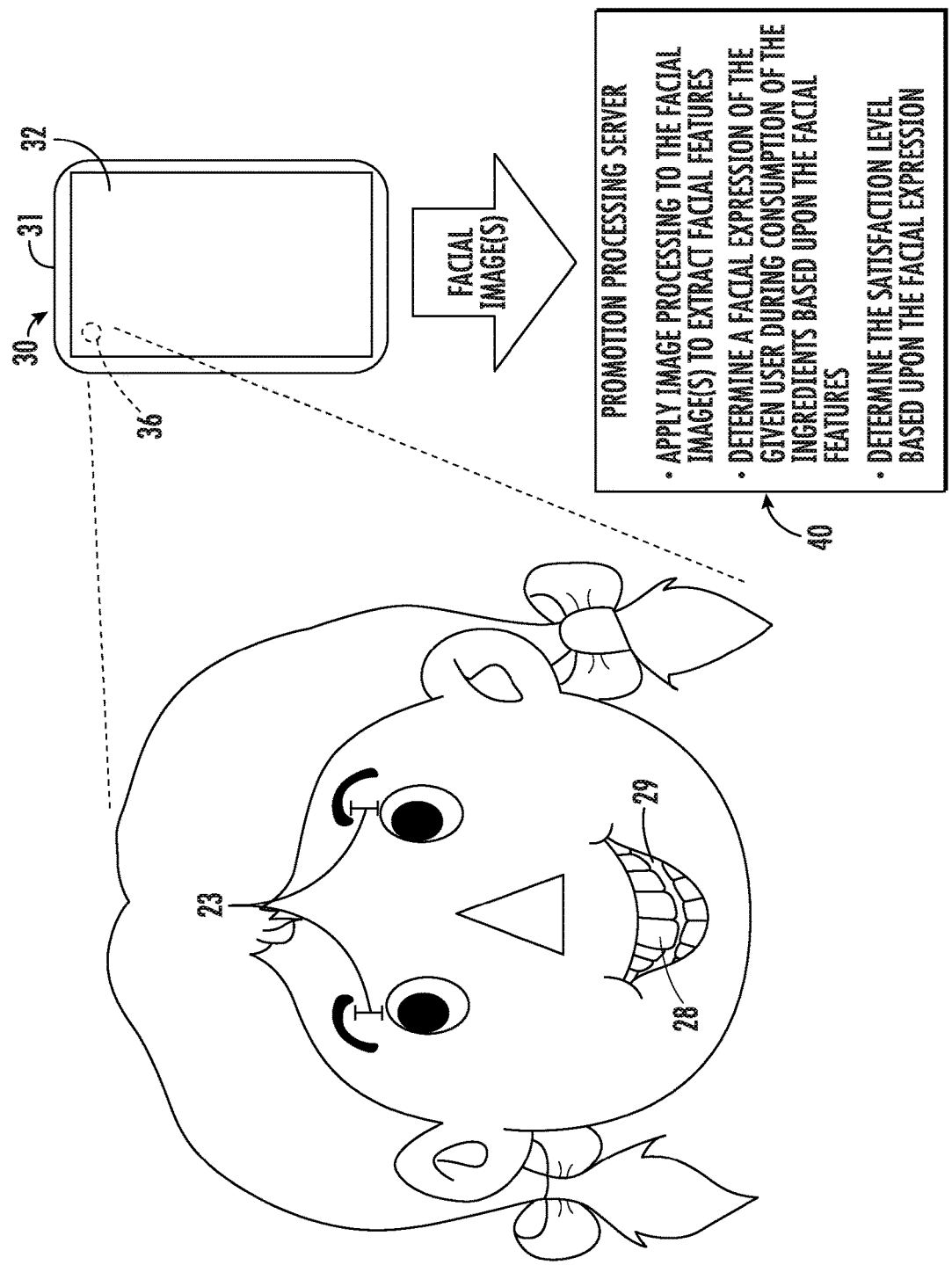
FIG. 4 is a schematic diagram of a promotion processing system according to an embodiment.
Figure 5:
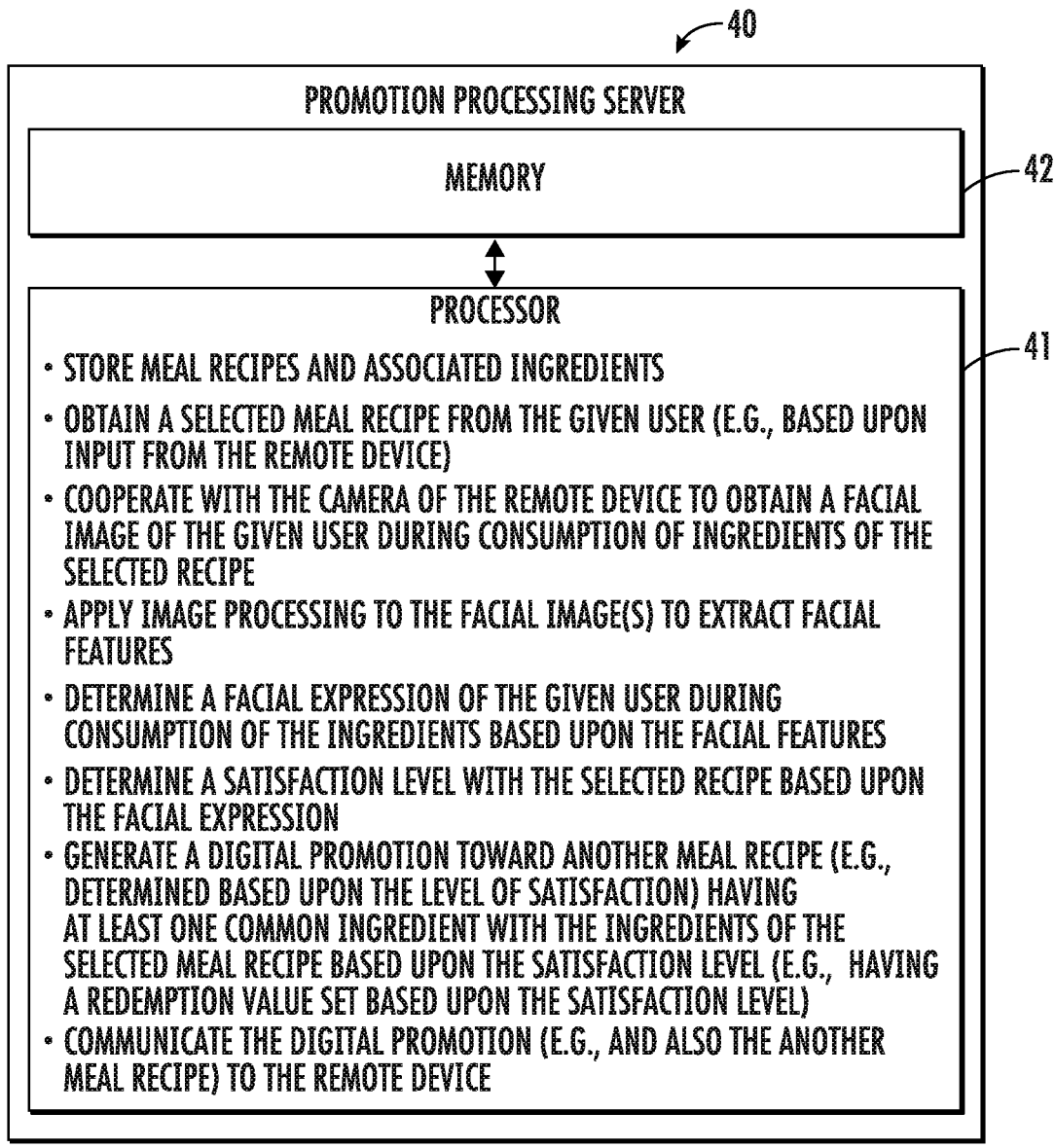
FIG. 5 is a schematic block diagram of the promotion processing system of FIG. 4.
Figure 6:
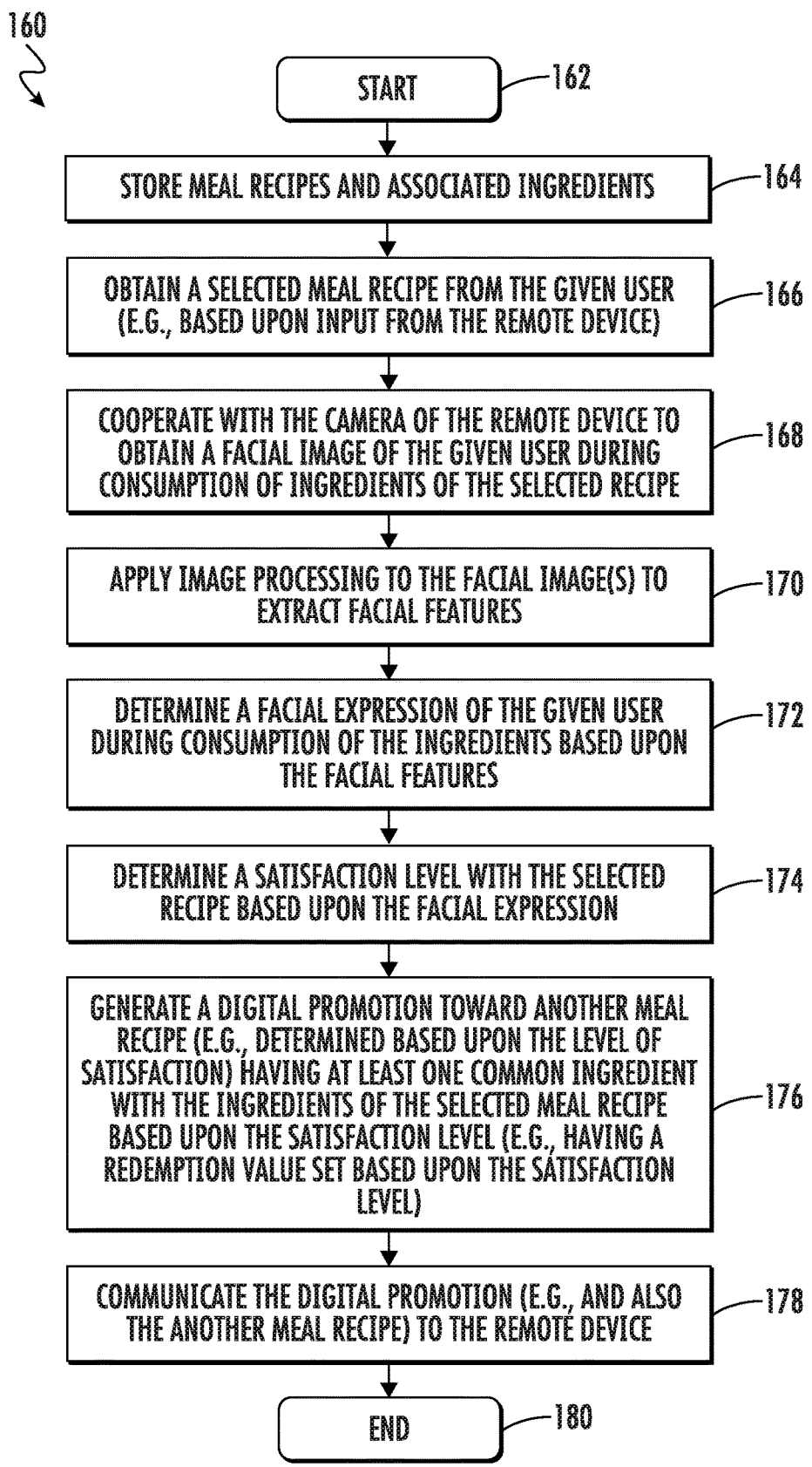
FIG. 6 is a flow diagram illustrating operation of the promotion processing server of FIG. 5.

Referring now to FIGS. 4-5, and the flowchart 160 in FIG. 6, beginning at Block 162, more detailed operations of the promotion processing server 40 will now be described, particularly with respect to determining the satisfaction level. Blocks 164-168 are similar to Blocks 64-68 described above and need no further description.

At Block 170, the promotion processing server 40 applies image processing to the facial image 27 or images to extract facial features. Exemplary facial features include visibility of teeth 28, a mouth-opening distance 29, and an eyebrow raise distance 23. Of course other facial features may be extracted, for example, as described in the technical article entitled, "Facial expression (mood) recognition from facial images using committee neural networks" by Saket S. Kulkarni, Narender P. Reddy, and S I Hariharan, the entire contents of which are hereby incorporated by reference.

The promotion processing server 40 determines a facial expression of the given user during consumption of the ingredients based upon the facial features (Block 172). More particularly, the promotion processing server 40 may determine the given user is smiling, for example, based upon frown lines and visibility of teeth 28. In contrast, the promotion processing server 40 may determine the given user is unhappy based upon frown lines and lack of visible teeth 28. Distances and other facial features can be mapped to determine a facial expression, for example, using a look-up table and/or machine learning from the given user or across multiple users (e.g., using regression algorithms).

At Block 174, the promotion processing server 40 determines the satisfaction level based upon the facial expression. For example, the facial expression may be one of excitement rather than happiness, and thus the satisfaction level may be indicative of greater satisfaction. A larger amount of teeth 28 showing relative to other facial expressions may be indicative of a higher amount of satisfaction, for example.

In some embodiments, the promotion processing server 40 may use a relative position or a reference position to extract the satisfaction level. For example, the promotion processing server 40 may use changes in relative facial features or expressions when multiple facial images 27 of the given user are obtained during consumption of the selected meal recipe 21b. If the given user typically, in a neutral facial expression has teeth showing, then the promotion processing server 40 may set that amount of teeth showing as a reference amount and determine the facial expression based upon changes in the amount of teeth showing relative to the reference amount. Of course, while the amount of teeth showing has been described, use of a reference position may be applicable to any extracted facial feature, as will be appreciated by those skilled in the art. Blocks 176 and 178 are similar to Block 76 and 78 described above and need no further description. Operations end at Block 180.

A method aspect is directed to a method of processing a promotion. The method includes using promotion processing server 40 to store a plurality of meal recipes 21a-21n and associated ingredients 22a-22n, obtain a selected meal recipe 21b from a given user, and cooperate with a camera 36 of a remote device 30 associated with the given user to obtain a facial image 27 of the given user during consumption of ingredients of the selected meal recipe. The method also includes using the promotion processing server 40 to determine a satisfaction level with the selected meal recipe 21b based upon the facial image 27, generate a digital promotion 24 toward another meal recipe 25 having at least one common ingredient 22b with the ingredients 22a-22n of the selected meal recipe 21b based upon the satisfaction level, and communicate the digital promotion to the remote device 30.

A computer readable medium aspect is directed to a non-transitory computer readable medium for processing a promotion. The non-transitory computer readable medium includes computer executable instructions that when executed by a processor 41 cause the processor to perform operations. The operations include storing a plurality of meal recipes 21a-21n and associated ingredients 22a-22n and obtaining a selected meal recipe 21b from a given user. The operations also include cooperating with a camera 36 of a remote device 30 associated with the given user to obtain a facial image 37 of the given user during consumption of ingredients of the selected meal recipe 21b and determining a satisfaction level with the selected meal recipe based upon the facial image. The operations also include generating a digital promotion 24 toward another meal recipe 25 having at least one common ingredient 22b with the ingredients 22a-22n of the selected meal recipe 21b based upon the satisfaction level, and communicating the digital promotion to the remote device 30.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A promotion processing system comprising:
   a remote device associated with a given user and comprising a camera; and
   a promotion processing server configured to
      store a plurality of meal recipes and associated ingredients,
      obtain a selected meal recipe from the given user,
      cooperate with the camera of the remote device to obtain a facial image of the given user during consumption of ingredients of the selected meal recipe,
      apply image processing to the facial image to extract a plurality of facial features,
      apply machine learning to determine a facial expression of the given user during consumption of the ingredients based upon mapping the plurality of facial features using a regression algorithm, and
      determine a satisfaction level with the selected meal recipe based upon the facial expression,
      generate a digital promotion toward another meal recipe having at least one common ingredient with the ingredients of the selected meal recipe based upon the satisfaction level, and
      communicate the digital promotion to the remote device.

2. The promotion processing system of claim 1 wherein at least one of the plurality of facial features comprises a visibility of teeth.

3. The promotion processing system of claim 1 wherein at least one of the plurality of facial features comprises a mouth-opening distance.

4. The promotion processing system of claim 1 wherein at least one of the plurality of facial features comprises an eyebrow raise distance.

5. The promotion processing system of claim 1 wherein the at least one digital promotion has a redemption value associated therewith; and wherein the promotion processing server is configured to set the redemption value based upon the satisfaction level.

6. The promotion processing system of claim 1 wherein the promotion processing server is configured to determine the another meal recipe based upon the satisfaction level.

7. The promotion processing system of claim 1 wherein the promotion processing server is configured to communicate the another meal recipe to the remote device.

8. The promotion processing system of claim 1 wherein the digital promotion is redeemable toward the common ingredient of the another meal recipe.

9. The promotion processing system of claim 1 wherein the promotion processing server is configured to obtain the selected meal recipe based upon user input at the remote device.

10. The promotion processing system of claim 1 wherein the remote device comprises a mobile wireless communications device.

11. A promotion processing server comprising:
    a processor and an associated memory configured to
       store a plurality of meal recipes and associated ingredients,
       obtain a selected meal recipe from a given user,
       cooperate with a camera of a remote device associated with the given user to obtain a facial image of the given user during consumption of ingredients of the selected meal recipe,
       apply image processing to the facial image to extract a plurality of facial features,
       apply machine learning to determine a facial expression of the given user during consumption of the ingredients based upon mapping the plurality of facial features using a regression algorithm, and
       determine a satisfaction level with the selected meal recipe based upon the facial expression,
       generate a digital promotion toward another meal recipe having at least one common ingredient with the ingredients of the selected meal recipe based upon the satisfaction level, and
       communicate the digital promotion to the remote device.

12. The promotion processing server of claim 11 wherein the at least one digital promotion has a redemption value associated therewith; and wherein the processor is configured to set the redemption value based upon the satisfaction level.

13. The promotion processing server of claim 11 wherein the processor is configured to determine the another meal recipe based upon the satisfaction level.

14. The promotion processing server of claim 11 wherein the processor is configured to communicate the another meal recipe to the remote device.

15. A method of processing a promotion comprising:
    using a promotion processing server to
       store a plurality of meal recipes and associated ingredients,
       obtain a selected meal recipe from a given user,
       cooperate with a camera of a remote device associated with the given user to obtain a facial image of the given user during consumption of ingredients of the selected meal recipe,
       apply image processing to the facial image to extract a plurality of facial features,
       apply machine learning to determine a facial expression of the given user during consumption of the ingredients based upon mapping the plurality of facial features using a regression algorithm, and
       determine a satisfaction level with the selected meal recipe based upon the facial expression,
       generate a digital promotion toward another meal recipe having at least one common ingredient with the ingredients of the selected meal recipe based upon the satisfaction level, and
       communicate the digital promotion to the remote device.

16. The method of claim 15 wherein the at least one digital promotion has a redemption value associated therewith; and wherein using the promotion processing server comprises using the promotion processing server to set the redemption value based upon the satisfaction level.

17. The method of claim 15 wherein using the promotion processing server comprises using the promotion processing server to determine the another meal recipe based upon the satisfaction level.

18. A non-transitory computer readable medium for processing a promotion, the non-transitory computer readable medium comprising computer executable instructions that when executed by a processor cause the processor to perform operations comprising:
    storing a plurality of meal recipes and associated ingredients;
    obtaining a selected meal recipe from a given user;
    cooperating with a camera of a remote device associated with the given user to obtain a facial image of the given user during consumption of ingredients of the selected meal recipe;

applying image processing to the facial image to extract a plurality of facial features;

applying machine learning to determine a facial expression of the given user during consumption of the ingredients based upon mapping the plurality of facial features using a regression algorithm; and determining a satisfaction level with the selected meal recipe based upon the facial expression;

generating a digital promotion toward another meal recipe having at least one common ingredient with the ingredients of the selected meal recipe based upon the satisfaction level; and communicating the digital promotion to the remote device.

19. The non-transitory computer readable medium of claim 18 wherein the at least one digital promotion has a redemption value associated therewith; and wherein the operations comprise setting the redemption value based upon the satisfaction level.

20. The non-transitory computer readable medium of claim 18 wherein the operations comprise determining the another meal recipe based upon the satisfaction level.

\* \* \* \* \*